United States Patent [19]

Suzuki

[11] Patent Number: 5,233,696
[45] Date of Patent: Aug. 3, 1993

[54] MICROPROCESSOR HAVING PRECODER UNIT AND MAIN DECODER UNIT OPERATING IN PIPELINE PROCESSING MANNER

[75] Inventor: Nariko Suzuki, Tokyo, Japan
[73] Assignee: NEC Corporation, Tokyo, Japan
[21] Appl. No.: 573,746
[22] Filed: Aug. 28, 1990
[30] Foreign Application Priority Data
  Aug. 28, 1989 [JP] Japan ................................. 1-222057
[51] Int. Cl.⁵ ................................................. G06F 9/30
[52] U.S. Cl. ................................. 395/375; 364/DIG. 1;
  364/259; 364/259.9
[58] Field of Search ................... 395/DIG. 1, DIG. 2,
  395/375, 425, 700, 800; 364/DIG. 1, DIG. 2

[56] References Cited
U.S. PATENT DOCUMENTS
4,685,080  8/1987  Rhodes, Jr. et al. ............... 395/375
4,873,629  10/1989  Harris et al. ........................ 364/200
5,101,341  3/1992  Circello et al. ...................... 395/375

FOREIGN PATENT DOCUMENTS
0336091  10/1989  European Pat. Off. .
WO9003001  3/1990  PCT Int'l Appl. .

Primary Examiner—Robert B. Harrell
Attorney, Agent, or Firm—Sughrue, Mion, Zinn, Macpeak & Seas

[57] ABSTRACT

A microprocessor having the instruction decoding operation performed by a precoder unit and a main decoder unit which operates in a pipelined manner by providing a buffer for temporarily storing information from the precoder unit positioned between the precoder unit and the main decoder unit. The microprocessor supports different instruction formats and operand addressing modes without lowering the instruction decoding speed.

5 Claims, 4 Drawing Sheets

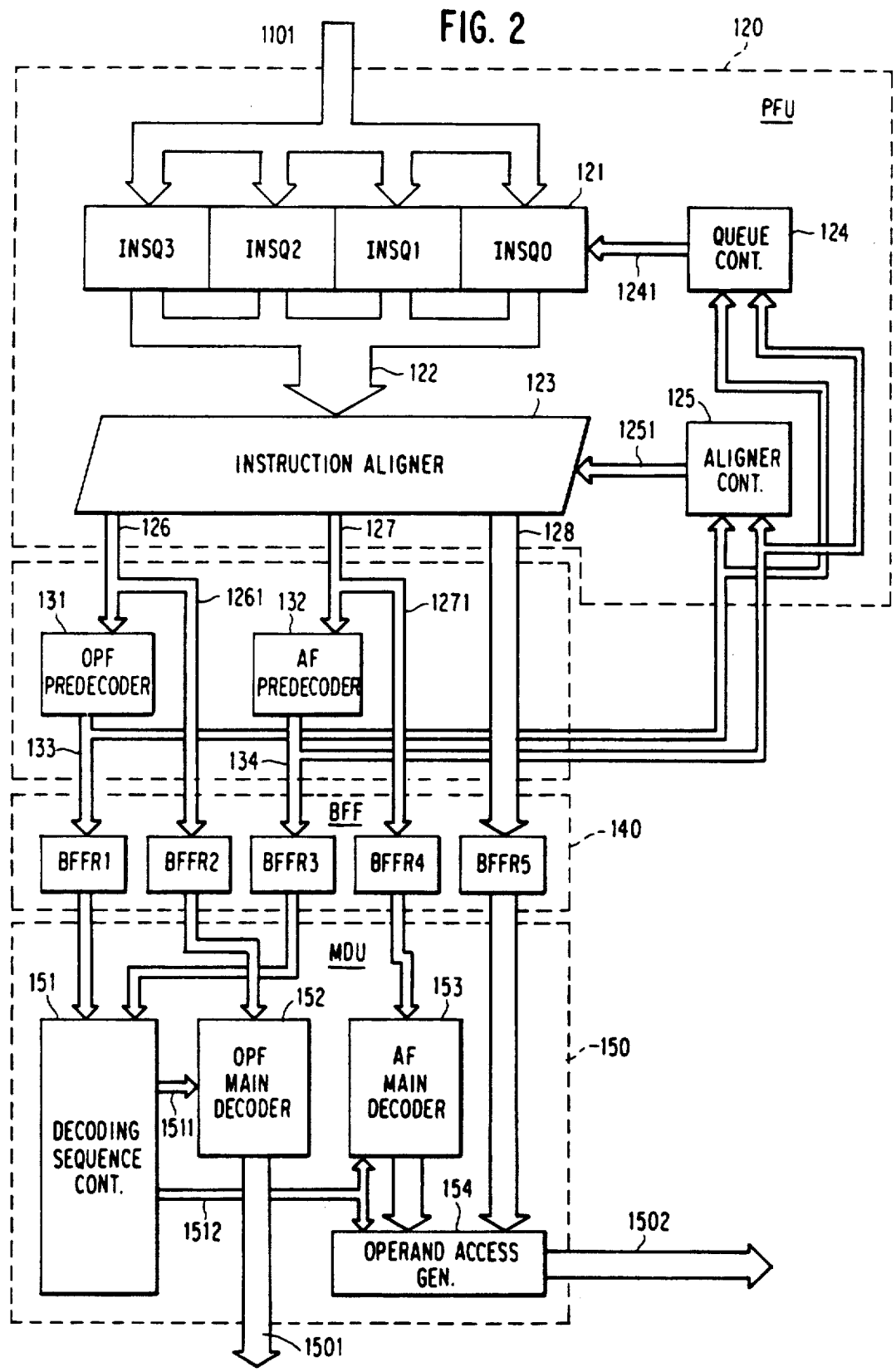

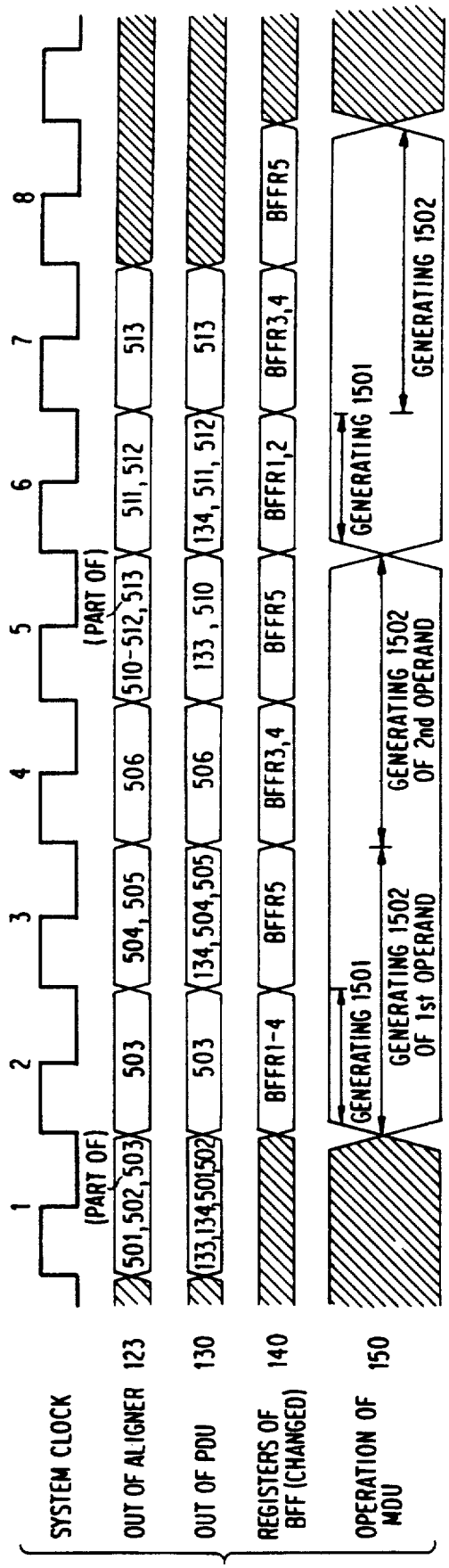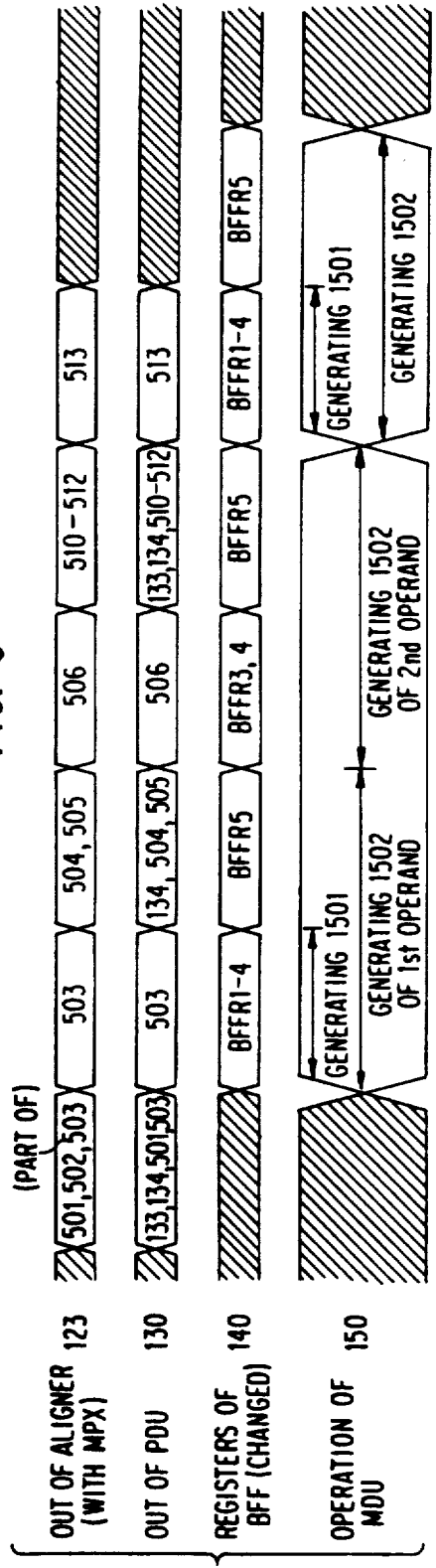

(2-OPERAND INSTRUCTION)

(1-OPERAND INSTRUCTION)

MICROPROCESSOR HAVING PRECODER UNIT AND MAIN DECODER UNIT OPERATING IN PIPELINE PROCESSING MANNER

BACKGROUND OF THE INVENTION

The present invention relates to a microprocessor and, more particularly, to an improvement in an instruction decoder unit of a pipelined microprocessor.

A pipelined microprocessor is constructed basically of six units: a bus control unit (BCU) for initiating a bus cycle to perform an instruction fetch operation and operand data read/write operation, an instruction prefetch unit (PFU) for requesting an instruction fetch bus cycle from the BCU to prefetch instructions, an instruction decoder unit (IDU) for decoding the instruction from the PFU and generating data processing information necessary for instruction execution and operand access information necessary for an operand data access, an effective address generator unit (EAG) for calculating an effective address in response to the operand access information, a memory management unit (MMU) for translating the effective address into a real address and requesting an operand data access from the BCU, and an instruction execution unit (EXU) for executing an instruction in response to the data processing information from IDU. These units operate in parallel in a predetermined pipeline processing manner.

In recent years, microprocessors have been required to facilitate software programming. For this purpose, an abundance of instruction formats are prepared, and moreover it is supported than an independent addressing mode can be designated to respective operands. Also in the addressing mode, a plurality of addressing modes are prepared, such as direct/indirect modes, displacement modes, indexed modes and so forth.

However, the support of abundant instruction formats and addressing modes causes instruction decoding time to be prolonged. Specifically, the IDU decodes an instruction to be executed and generates the data processing information and the operand access information in accordance with the decoding sequence determined by the format and the operand addressing mode of that instruction. Therefore, the support of many instruction formats and operand addressing modes prolongs the time for decoding and detecting the format and the operand addressing mode of an instruction to be executed to determine the decoding sequence. The generation of the data processing information and the operand access information is thereby delayed to disturb the pipeline processing operation. The execution efficiency of the microprocessor is thus lowered.

SUMMARY OF THE INVENTION

Therefore, an object of the present invention is to provide a microprocessor having an improved instruction decoding operation.

Another object of the present invention is to provide a microprocessor supporting abundant instruction formats and operand addressing modes without lowering the instruction decoding speed.

A microprocessor according to the present invention is characterized in that an instruction decoding operation is performed by a predecoder unit and a main decoder unit which operate in a pipeline manner by providing between those two units a buffer for temporarily storing information from the predecoder unit.

The predecoder unit includes first and second predecoders respectively for receiving an operation code (called hereinafter "OP-code") field and an addressing field of an instruction to be executed. The first predecoder predecodes the OP-code field and produces OP-code information representative of the number of bytes of the OP-code field and the number of operands to be processed. The second predecoder predecodes the addressing field and produces addressing mode information representative of the number of bytes of the operand and the addressing mode designated to the operand. The OP-code information and the addressing mode information are temporarily stored in the buffer. The buffer also stores the OP-code and addressing fields of the instruction, and further stores displacement data and immediate data of the instruction. The main decoder unit determines the decoding sequence to be performed in response to the OP-code information and the addressing mode information from the buffer, and performs the decoding operation on other information from the buffer to generate data processing information and operand access information in accordance with the determined decoding sequence. During the decoding operation of the main decoder unit, the predecoder unit is performing the predecoding operation on a second operand or an instruction to be executed next.

That is, the present invention is based upon the finding that the decoding operation on an instruction consists in general of a first operation of detecting the format and the operand addressing mode of the instruction and a second operation of generating decoded instruction information in response to the decoding sequence determined by the detected result in the first step, and thus allots the first and second steps respectively to the predecoder unit and the main decoder unit, which operate in a pipelined manner. Accordingly, the first operation is performed in parallel with the second operation, so that the operation time of the predecoder unit is put out of sight by the operation time of the main decoder unit. The whole pipeline processing operation of the microprocessor is thus hardly disturbed to enhance the program execution efficiency thereof.

BRIEF DESCRIPTION OF THE DRAWINGS

The above and other object, advantages and features of the present invention will be more apparent from the following description taken in conjunction with the accompanying drawings, in which:

FIG. 2 is a block diagram representative of constructions of the PFU, PDU, BFF and MDU shown in FIG. 1;

FIG. 3 is a timing chart for explaining an operation of the circuit shown in FIG. 2;

FIG. 5 is a timing chart for explaining an operation of the circuit shown in FIG. 4.

DETAILED DESCRIPTION OF THE EMBODIMENTS

Figure 1:
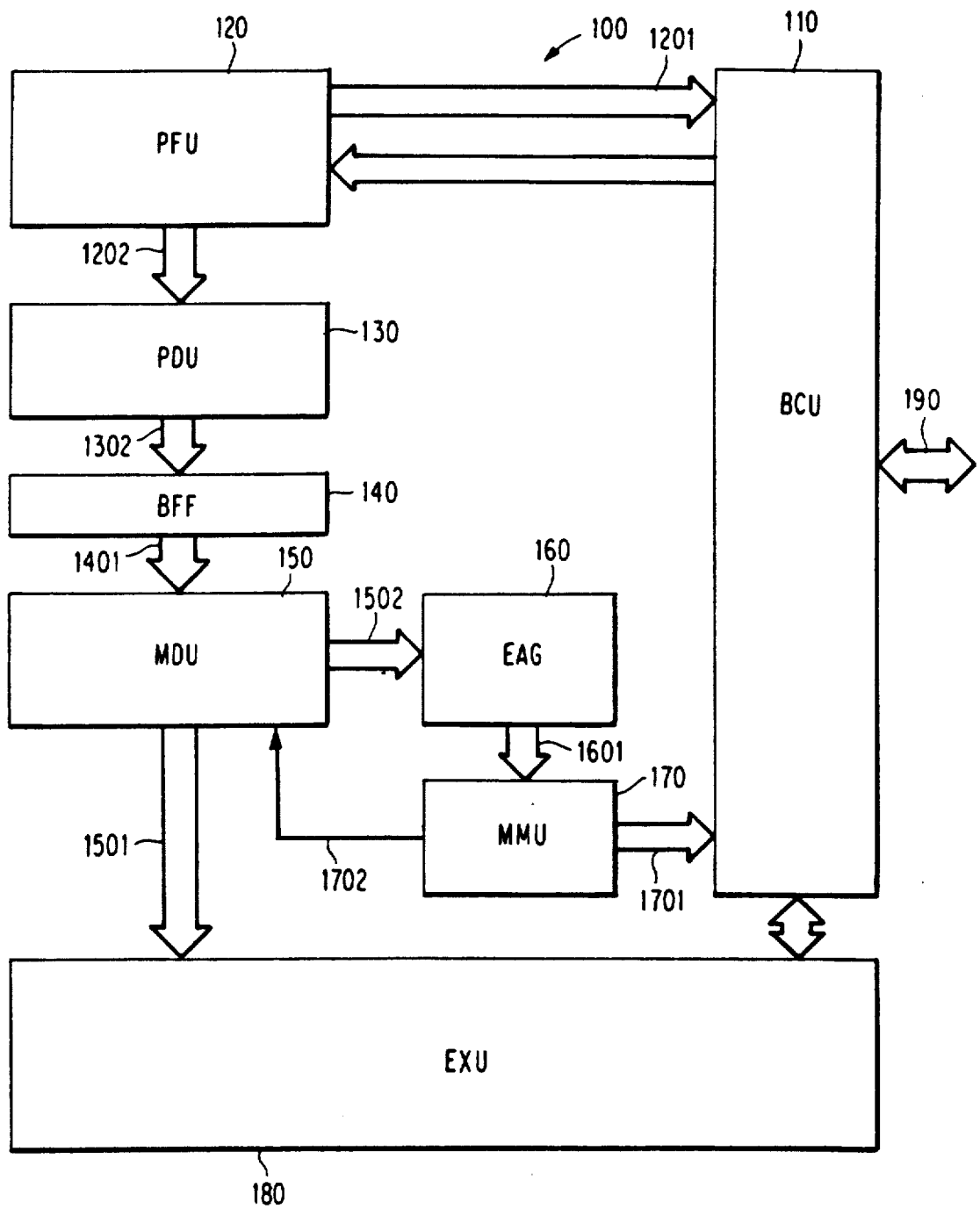
FIG. 1 is a block diagram representative of an embodiment of the present invention.

Referring now to FIG. 1, a microprocessor 100 according to an embodiment of the present invention includes a bus control unit (BCU) 110, which initiates a bus cycle onto a system bus 190 interconnected with a memory and peripheral I/O units (not shown) and fetches instructions and reads and writes operand data. An instruction prefetch unit (PFU) 120 includes a prefetch address pointer (not shown) and issues an instruction prefetch request including the content of this pointer to BCU 110 through a bus 1201. The prefetched instructions temporarily stored in BCU 110 are transferred via an instruction bus 1101 to PFU 120. PFU 120 aligns the OP-code and the operand(s) of the prefetched instruction and outputs them onto a bus 1202. The information on the bus 1202 is supplied to a predecoder unit (PDU) 130 provided in accordance with the present invention. PDU 130 predecodes the OP-code and generates OP-code information indicative of the byte length of the OP-code and the number of operands to be processed. Moreover, PDU 130 predecodes the operand(s) and generates addressing mode information indicative of the byte length of the operand and a designated addressing mode. The OP-code information and the addressing mode information are transferred onto a bus 1302 and temporarily stored in a buffer (BFF) 140 together with other information on the bus 1202. The contents of BFF 140 are supplied to a main decoder unit (MDU) 150 via a bus 1401. MDU 150 determines the decoding sequence in response to the OP-code information and the addressing mode information and performs a decoding operation in accordance with the determined decoding sequence to generate operand access information 1502 for accessing the operand and data processing information 1501 for executing the required instruction. The operand access information 1502 is supplied to an effective address generator unit (EAG) 160 which calculates and produces an effective address 1601 of the operand data. The effective address 1601 is supplied to a memory management unit (MMU) 170 and then translated into a read address. MMU 170 informs MDU 150 of the completion of the address translation through a signal 1702. MMU 170 further issues an operand access request to BCU 110 by supplying the real address. The data processing information 1501 from MDU 150 is supplied to an execution control unit (EXU) 180 which thus executes the required instruction or data process with receiving or transferring operand data from or to BCU 110 via a bus 1801. These units, BCU 110, PFU 120, PDU 130, MDU 150, EAG 160, MMU 170 and EXU 180, operate in parallel in a pipelined manner.

Turning to FIG. 2, there are shown internal block constructions of PFU 120, PDU 130, BFF 140 and MDU 150. If should be noted that only parts related to the present invention are shown in order to avoid complications in the drawing. The instruction bus 1101 from BCU 110 has a 32-bit length (i.e., a 4-byte length), and hence the instruction data having four bytes is prefetched by one prefetch operation and then transferred onto the bus 1101. The bus 1101 is connected in common to four pockets (INSQ0 to INSQ3) 121-1 to 121-4 of an instruction queue 121, each of which has a 4-byte memory capacity. The 4-byte instruction data from the bus 1101 is thus stored temporarily into one of the instruction queue pockets INSQ0-3 designated by queue pointer information 1241 generated by a queue controller 124. The queue pockets INSQ0-3 are designated in that order. For example, when the first queue pocket INSQ0 stores unprocessed instruction data, the instruction data on the bus 1101 is stored into the second queue pocket INSQ1. The contents of the queue pockets INSQ0-3 are tied up into instruction data 122 of a 16-byte length and then supplied to an instruction aligner 123. This aligner 123 includes an OP-code field output bus 126 of a 2-byte length, an addressing field output bus 127 of a 2-byte length and a data output bus 124 of a 4-byte length. The total byte length of one instruction including an OP-code field and an operand field is not constant, but is changed within a range from few bytes to ten and several bytes in dependence on the required data processing operation and/or the addressing mode of the operand(s). Therefore, the instruction aligner 123 responds to aligning pointer information 1251 from a aligner controller 125 and aligns the instruction data on the bus 122 such that the OP-code field, the addressing field and the displacement or immediate data of an instruction to be executed are transferred onto the buses 126, 127 and 128, respectively. These buses 126 to 128 correspond to the bus 1202 shown in FIG. 1.

The OP-code data on the bus 126 and the addressing field data on the bus 127 are supplied to an OP-code field (OPF) predecoder 131 and an addressing field (AF) predecoder 132 of PDU 130, respectively. In response to the OP-code field data, OPF predecoder 131 produces OP-code information 133 representative of the byte length of the OP-code field and the number of operands to be processed. AF predecoder 132 produces addressing mode information 134 representative of the byte length of the operand and the addressing mode designated thereto in response to the addressing field. These sets of information 133 and 134 are supplied to the aligner controller 125 and the queue controller 124 of PFU 120. In response to the sets of information 133 and 134, the aligner controller 125 generates the aligning pointer information 1251 for controlling the positions and the number of the byte data to be outputted by the instruction aligner 123, and the queue controller 124 generates the queue pointer information 1241 for controlling the queue pocket INSQ where the instruction data are stored from the bus 1101. The OP-code information 133 and the addressing mode information 134 are temporarily stored into buffer registers (BFFR1 and BFFR3) 141 and 143, respectively. The OP-code field and the addressing field outputted from the aligner 123 are further transferred to BFF 140 via branch buses 1261 and 1271 and then temporarily stored in BFFR2 and BFFR4, respectively. The displacement data or the immediate data from the aligner 123 is supplied via the bus 128 to BFF 140 and then temporarily stored in BFFR5 thereof. The buses for information 133 and 134, the branch buses 1261 and 1271 and the bus 128 correspond to the bus 1302 shown in FIG. 1.

The data stored in BFFR1 and BFFR3, i.e. the OP-code information 133 and the addressing mode information 134, are supplied to a decoding sequence controller 151 of MDU 150. The controller 151 thus determines immediately the decoding sequence to be performed since the information 133 and 134 has the above-mentioned contents, and then produces the determined sequence information 1511 and 1512. The sequence information 1511 is supplied to an OPF main decoder 152 which also receives the OP-code field data from BFFR2. Accordingly, the decoder 152 generates data processing information 1501 necessary for instruction execution and supplies it to EXU 180. The addressing field data from BFFR4 is supplied to an AF main decoder 153 and the displacement or immediate data from BFFR5 is supplied to an operand access information generator 154. These units 153 and 154 operate in accordance with the addressing sequence information 1512 and thus generate the operand access information 1502 which is in turn supplied to EAG 160.

Figure 6A:
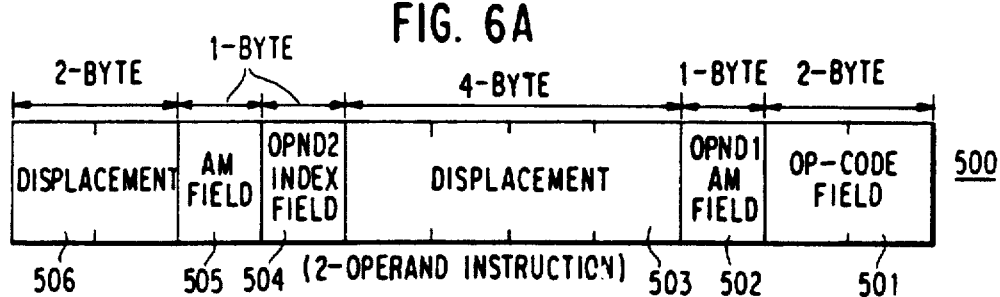
FIGS. 6A and 6B are format diagrams indicative of two examples of instructions.
Figure 6B:
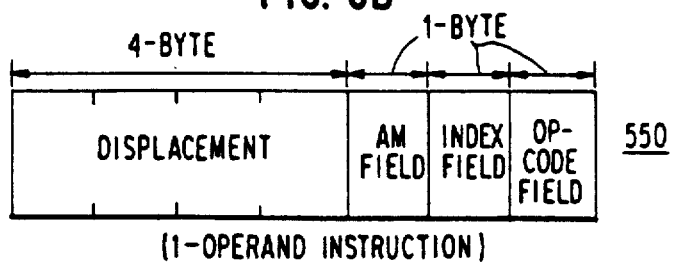

As mentioned above, the whole byte length of an instruction to be executed changes depending on the required data processing operation and the addressing mode designated to the operand(s) to be processed. Two examples representative of different instruction formats are shown in FIGS. 6A and 6B. The instruction shown in FIG. 6A is a 2-operand instruction 500 having a first operand to which a displacement mode is designated as an addressing mode and a second operand to which a displacement indexed mode is designated as an addressing mode. In detail, this instruction 500 is composed of the OP-code field 501 of 2-byte length, a first operand addressing mode (OPND1-AM) field 502 of 1-byte length, displacement data 503 of 4-byte length, a second operand (OPND2) index field 504 of 1-byte length, an AM mode field 505 of 1-byte length and displacement data 506 of 2-byte length, and thus has an 11-byte length in total. The instruction shown in FIG. 6B is a 1-operand instruction 550 in which a displacement indexed mode is designated as addressing mode for one operand. This instruction 550 is composed of an OP-code field 510 of 1-byte length, an index field 511 of 1-byte length, an AM field 512 of 1-byte length and displacement data 513 of 4-byte length, and thus has a 7-byte length in total.

Next, an operation will be made below with reference to FIGS. 1, 2 and 6 and further to FIG. 3 showing a timing chart. Assume that the instructions 500 and 550 shown in FIG. 6 are stored into the instruction queue 121. However, since the instruction queue 121 is of 16-byte length in total, the lower order two-byte data of the displacement 513 of the instruction 550 is not yet stored in the queue 121.

Since the previous instruction has been already transferred to PDU 130, the aligner controller 125 controls the aligning pointer information 1251 such that the instruction aligner 123 outputs the first and second byte data of 16-byte instruction data 122 onto the bus 126 and the third and fourth byte data thereof onto the bus 127. That is, the OP-code field 501 of the instruction 500 is outputted onto the bus 126 and OPND1-AM field 502 and the first byte of the displacement data 503 is outputted onto the bus 127 during a first clock ① of a system clock shown in FIG. 3. In response thereto, OPF predecoder 131 produces the OP-code information 133 and AF predecoder 132 produces the addressing mode information 134. The OP-code information 133 represents that the instruction 500 has an OP-code field of 2-byte length with two operands. The addressing mode information 134 represents that the first operand has a displacement mode addressing and the displacement data has a 4-byte length. It is noted that the first byte of the displacement 503 supplied to AF predecoder 132 is ignored. In response to the contents of the information 133 and 134, the aligner controller 125 controls the content of the pointer information 1251 such that the instruction aligner 123 outputs the fourth to seventh byte bytes of the 16-byte instruction data 122 onto the bus 128 during the next clock ②, and the queue controller 124 controls the contents of the pointer information 1241 such that new instruction data are allowed to be stored into the first to third byte positions of the queue pocket INSQ0.

In response to the beginning of the clock ②, the information 133 and 134 and the field data 501 and 502 from PDU 130 are stored into the corresponding buffer registers BFFR of BFF 140. On the other hand, the instruction aligner 123 outputs the displacement data 503 of 4-byte length onto the bus 128. During this clock ②, MDU 150 performs the decoding operation in accordance with the decoding sequence information determined by the sequence controller 151. Thus, OPF main decoder 152 produces the data processing information 1501 representative of the required operation on two operand data, and AF main decoder 153 advances the access information generating operation to a state in which only the displacement 503 is required to complete the generation of the operand access information 1502. The aligner controller 125 controls the content of the pointer information 1251 such that the instruction aligner 123 outputs the ninth and tenth byte of the instruction data 122 onto the bus 127 during a next clock ③.

When the clock ③ appears, the displacement data 503 is stored in BFFR5, so that MDU 150 completes the generation of the operand access information 1502 for the first operand data, the information 1502 being in turn transferred to EAG 160. On the other hand, OPND2 index field data 504 and AM field data 505 are outputted onto the bus 127 from the aligner 124. Therefore, AF predecoder 132 produces the addressing mode information 134 representing that the addressing mode of the second operand is a displacement indexed mode and the displacement data has 2-byte length.

In a clock ④, MDU 150 starts to generate the access information for the second operand data, and the instruction aligner 123 outputs the displacement data 506 onto the bus 128. During a next clock ⑤, the displacement data 506 is supplied to MDU 150 via BFFR5, and hence the operand access information 1502 for the second operand data is generated and supplied to EAG 160. When the instruction aligner 123 outputs the displacement data 506, the aligning operation for the instruction 500 is completed. Therefore, the aligner controller 125 controls the pointer information 1251 to cause the instruction aligner 123 to output the twelfth and thirteenth byte data of the instruction data 122 onto the bus 126 and the fourteenth and fifteenth byte data thereof onto the bus 127, respectively, during the clock ⑤. Thus, the OP-code field 510 and the index field 511 of the instruction 510 are supplied to the OPF predecoder 131 and the AM field 512 and the first byte of the displacement 513 are supplied to AF predecoder 132. The information 133 from OPF predecoder 131 represents that the OP-code field has 1-byte length and the number of operand data is one. Accordingly, the aligner controller 125 detects that the index field 511 is not supplied to AF predecoder 132, and thus controls the pointer information 1251 to cause the instruction aligner 123 to output the fields 511 and 512 onto the bus 127 in a next clock ⑥. On the other hand, the OPF main decoder 152 performs the decoding operation during the clock ⑥, so that the data processing information 1501 for the instruction 550 is generated.

When a next clock ⑦ appears, the addressing mode information 134 from AF predecoder 132 and field data 511 and 512 are supplied to MDU 150. The information 134 represents that the displacement data 513 has 4-byte length. In addition, the instruction prefetch operation by PFU 120 has been performed during clocks ③ to ⑥, so that the remaining two byte data of the displacement 513 already has been stored in the first and second byte positions of the queue pocket INSQ0. Accordingly, all the four byte data of the displacement 513 are outputted from the aligner 123 during the clock ⑦, so that are operand access information for the operand data of the instruction 550 is generated in a next clock ⑧.

Thus, although the decoding sequence and the control to the instruction aligner 123 are changed depending on the format and the operand addressing mode of an instruction to be executed, PDU 140 release MDU 150 from decoding of the instruction format and the operand addressing mode and from the control to the aligner 123. Moreover, PDU 140 and MDU 150 operate in a pipelined manner by providing BFF 140 therebetween. Accordingly, the operation by the PDU 140 can be put out of sight in a whole decoding operation. A high speed decoding operation is thus performed.

Figure 4:
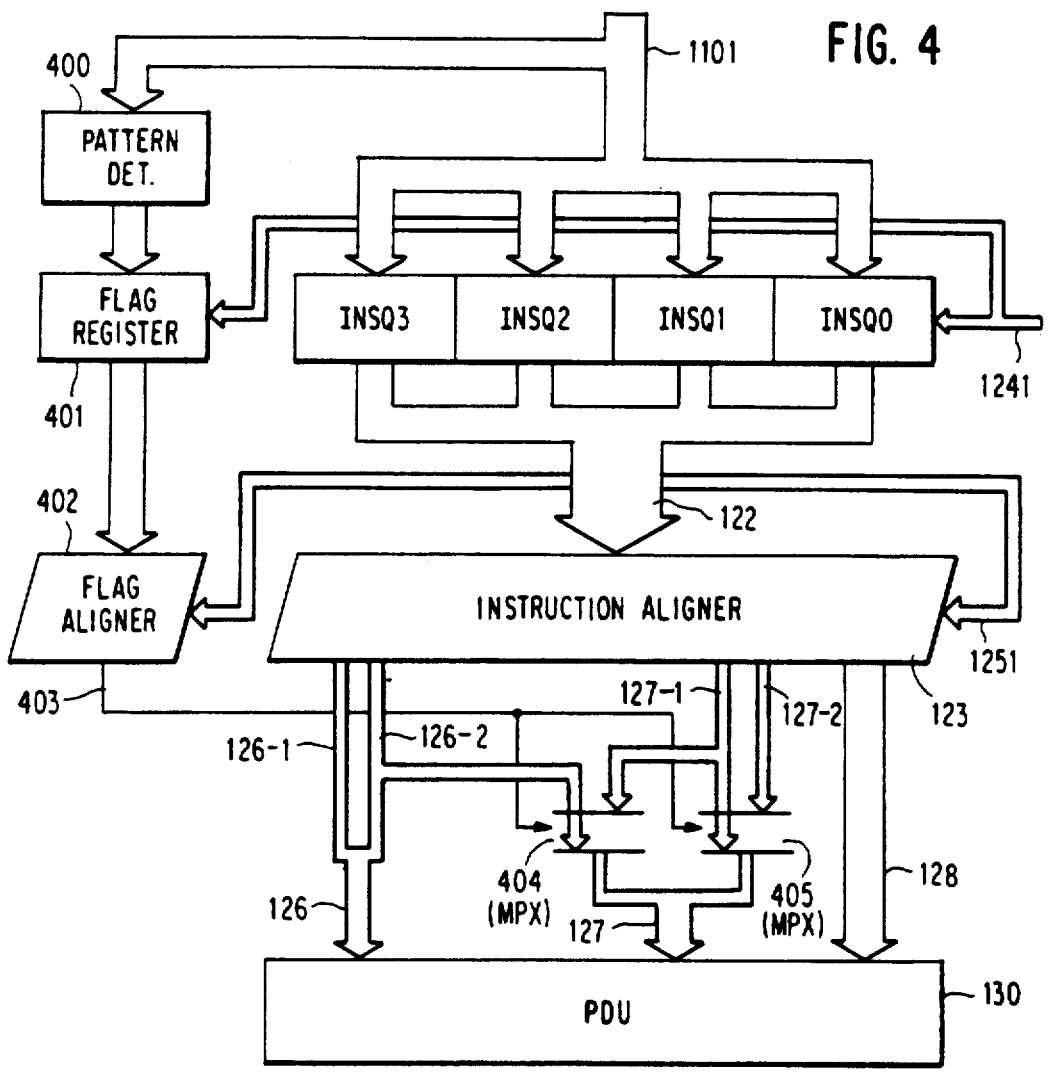
FIG. 4 is a block diagram representative of the PFU according to another embodiment of the present invention.

In the above embodiment, the field data 511 and 512 of the instruction 550 are outputted twice from the instruction aligner 123, as described in the operation concerning clocks ⑤ and ⑥. If such a construction is realized that the decoding operation of the instruction 505 is completed by outputting the field data 511 and 512 from the aligner 123 only once, the decoding speed is further enhanced. The construction for this purpose is shown in FIG. 4 as another embodiment of the present invention, in which the same constituents as those shown in FIG. 2 are denoted by the same reference numerals to omit further description thereof.

In this embodiment, it is assured that the first 3 bits of the OP-code of the instruction have 1-byte length OP-code are all "1". Specifically, a pattern detector 400 is provided to be connected to the instruction bus 1101. This detector 400 detects whether the first 3 bits of the respective byte data are all "1". When the first 3 bits are all "1", the detector 400 sets the corresponding bit of a flag register 401 to "1". On the other hand, in case where at least one of the 3 bits is "0", the detector 400 resets the corresponding bit of the register 401 to "0". The flag register 401 is thus of a 16-bit construction. The content of the register 401 is supplied to a flag aligner 402 which also receives the pointer information 1251. In response to the content of the pointer information 1251, the aligner 402 selects one bit of the register 401 and outputs the selected bit data. In other words, the flag aligner 402 outputs one bit of the data of the register 401, which bit corresponds to the position of the byte data of the 16-byte data 122 outputted onto the first byte bus 126-7 of the bus 126 by the instruction aligner 123. For example, when the instruction aligner 123 outputs the twelfth byte data of the instruction data 122 onto the bus 126-1, the flag aligner 402 outputs the twelfth bit data of the flag register 401. The second byte bus 126-2 of the bus 126 and the first byte bus 127-1 of the bus 127 are coupled to a multiplexer (MPX) 404, and the first and second byte buses 127-1 and 127-2 of the bus 127 are coupled to a multiplexer (MPX) 405. The outputs from MPXs 404 and 405 are tied to the addressing field output bus 127 coupled to PDU 130. MPXs 404 and 405 are controlled by the data 403 from the flag aligner 402. When this data 403 is "1", MPXs 404 and 405 select the buses 126-2 and 127-1, respectively. When the data 403 is "0", the buses 127-1 and 127-2 are selected by MPXs 404 and 405, respectively.

An operation timing chart according to this embodiment is shown in FIG. 5 in comparison with that shown in FIG. 3 according to the previous embodiment. When the OP-code field data 501 of the instruction 500 is outputted onto the bus 126 at the clock ①, the flag aligner 402 outputs the data 403 of "0", since the OP-code field 501 has 2-byte length. Accordingly, outputted onto the bus 127 are AM field data 502 and the first byte of the displacement data 503. Thus, the aligning operation and the decoding operation with respect to the instruction 500 are identical in both embodiments. On the other hand, when the OP-code field data 510 of the instruction 550 is outputted onto the bus 126-1 at the clock ⑤, the flag aligner 402 outputs the data 403 of "1". Accordingly, the index field data 511 on the bus 126-2 is transferred as a first byte data onto the bus 127 via MPX 404, and the AM field data 512 on the bus 127-1 is transferred as a second byte data onto the bus 127 via MPX 405. These field data 511 and 512 are thereby supplied to AF predecorder 132. As a result, the displacement data 513 is outputted from the aligner 123 at the clock ⑥, and the decoding operation for the instruction 550 is completed at the clock ⑦. Thus, the decoding speed is further enhanced.

The present invention is not limited to the above embodiment, but may be changed and modified without departing from the scope and spirit of the invention.

What is claimed is:

1. A microprocessor having an instruction decoder unit which decodes an instruction to be executed and generates data processing information for executing said instruction and operand access information for accessing operand data of said instruction, said instruction decoder unit comprising a predecoder unit receiving data of an operation code field and an addressing mode filed of said instruction and generating operation code information relative to a format of said instruction and addressing mode information relative to an addressing mode designated to operand data to be processed, buffer means coupled to receive in parallel said operation code information and said addressing mode information for temporarily storing and outputting in parallel said operation code information and said addressing mode information, said buffer means being further coupled to temporarily store and output information necessary to generate said data processing information and said operand access information contained in said instruction in parallel to said operation code information and said addressing mode information, and a main decoder unit receiving in parallel information outputted in parallel from said buffer means and generating said data processing information and said operand access information in response to thereto, said predecoder unit and said main decoder unit operating in a pipelined manner.

2. The microprocessor as claimed in claim 1, further comprising an instruction prefetch unit for providing said instruction to said instruction decoder unit.

3. A microprocessor comprising an instruction aligner having an input bus receiving an instruction to be executed and further having first, second and third output buses, said instruction including operation code field data, addressing field data and constant field data, said instruction aligner aligning said instruction to output said operation field data, said addressing field data and said constant field data of said instruction onto said first, second and third output buses, respectively, a first decoder coupled to said first output bus for decoding said operation code field data to produce operation code instruction representing at least a byte length of said operation code field data and a number of operand data to be processed, a second decoder coupled to said second output bus for decoding said addressing field data to produce addressing mode information representing at least a byte length of said operand data and an addressing mode designated to said operand data, buffer means coupled to said first, second and third output buses and said first and second decoders for temporarily storing and outputting in parallel information supplied thereform, and a third decoder coupled to said buffer means to receive in parallel information outputted in parallel from said buffer means for generating decoded information for executing said instruction in response thereto, said first and second decoders and said third decoder operating in a pipelined manner.

4. The microprocessor as claimed in claim 3, further comprising means for detecting a byte length of said operation code filed data and means responsive to an output from said detecting means for transferring the information derived from said first bus to said second bus.

5. A microprocessor comprising an instruction aligner having an input bus supplied with an instruction to be executed, a control bus supplied with alignment information and first, second and third output buses, said instruction including operation code field data, addressing field data and constant field data, said instruction aligner responding to said alignment information and aligning said instruction to output said operation code filed data, said addressing field data and said constant field data onto said first, second and third output buses, respectively, a predecoder unit coupled to said first and second buses and decoding said operation code field data and said addressing field data to produce operation code information and addressing mode information, said operation code information representing at least a byte length of said operation code field data and a number of operand data to be processed and said addressing mode information representing at least a byte length of said operand data and an addressing mode designated to said operand data, an aligner controller coupled to said predecoder unit and responding to said operation code information and said addressing mode information to generate said alignment information that causes said instruction aligner to output the operation code field data, the addressing field data and the constant field data onto said first, second and third output buses, respectively, a buffer coupled to said first, second and third output buses and said predecoder unit and temporarily storing and outputting in parallel information supplied therefrom, and a main decoder unit coupled to said buffer to receive in parallel information outputted in parallel from said buffer and responding thereto to generate data processing information needed to execute said instruction and operand access information needed to access said operand data, said predecoder unit and said main decoder unit operating in a pipelined manner.

* * * * *